United States Patent [19]

Off et al.

[11] 4,145,388
[45] Mar. 20, 1979

[54] METHOD OF MANUFACTURING GARMENTS

[75] Inventors: Joseph W. A. Off, Irving; Judson H. Early, Dallas, both of Tex.

[73] Assignee: Haggar Company, Dallas, Tex.

[21] Appl. No.: 849,769

[22] Filed: Nov. 9, 1977

[51] Int. Cl.² .............................................. B29C 13/00
[52] U.S. Cl. ...................................... 264/24; 264/113; 264/126; 264/131
[58] Field of Search ................ 264/24, 113, 126, 40.1, 264/131

[56] References Cited

U.S. PATENT DOCUMENTS

| | | | |
|---|---|---|---|
| 2,900,291 | 8/1959 | O'Connell | 154/101 |
| 3,689,608 | 9/1972 | Hollberg et al. | 264/24 |
| 3,836,416 | 9/1974 | Ropiequet | 161/2 |
| 3,898,311 | 8/1975 | Mitchell et al. | 264/126 |

*Primary Examiner*—Robert F. White
*Assistant Examiner*—James R. Hall
*Attorney, Agent, or Firm*—Richards, Harris & Medlock

[57] ABSTRACT

In a method of manufacturing garments, a mold is provided in the shape and size of the desired garment. The mold includes a matrix of conductors by which variable predetermined electrostatic fields can be established over the mold. A plurality of fiber layers are electrostatically deposited onto the mold to form a garment wherein at least some of the fibers comprising preselected layers are oriented according to the elasticity requirements of particular areas of the garment. Preferably, the garment is then at least partially precured, after which a plurality of colorants can be applied in sequence electrostatically to the garment to produce predetermined patterns, if desired. The garment is then cured to set the fiber layers and colorants, after which the garment is removed from the mold for subsequent finishing.

12 Claims, 6 Drawing Figures

METHOD OF MANUFACTURING GARMENTS

BACKGROUND AND SUMMARY OF THE INVENTION

The present invention relates generally to a method of manufacturing garments, and particularly to a method of manufacturing nonwoven garments by the electrostatic deposition of fibers and dyes on a mold.

Traditionally, garments have been fabricated by sewing together sections of fabric material. Under the current state of the art, natural or synthetic textile fibers are first woven into lengths of material in bulk quantities. The particular color and pattern characterizing a particular fabric can be formed either by utilizing dyed fibers during the weaving process, or by printing techniques subsequent to the weaving process. Numerous steps are thus required to produce a fabric suitable for garment fabrication. To reduce costs, many of these steps have been automated, which has necessitated large production runs by the textile mills, and large inventories by the garment manufacturers. After the material is acquired by the garment manufacturers the various pieces of fabric comprising a garment of a specific size are then individually sized and cut to shape. Owing to the irregular shape of most of the garment pieces, significant waste occurs at this stage. The precut pieces of fabric are then sewn together during numerous time consuming and costly manual operations which further tend to increase the cost of garment fabrication. It will thus be appreciated that the cost of manufacturing a garment represents all of the various costs between manufacture of the fabric to construction of pieces of fabric into a desired garment.

The present invention comprises a method of manufacturing garments which overcomes the foregoing and other difficulties long since associated with the prior art. In accordance with the broader aspects of the invention, a mold is provided in the shape of the desired garment. A plurality of layers of fibers are electrostatically deposited over the mold to define the garment. At least some of the fibers comprising preselected layers thereof are electrostatically oriented in accordance with the elasticity requirements of particular areas of the garment. If desired, one or more colorants can then be applied electrostatically to the garment. After final curing to set the color pattern and fibers, the garment is removed from the mold for finishing. By this method, garments can be fabricated on demand from minimum inventory eliminating many of the time consuming and costly procedures heretofore required in weaving a fabric and then working that fabric into a garment.

In accordance with more specific aspects of the invention, a male mold is provided in the shape and size of the desired garment. The mold includes a matrix of conductors by which predetermined electrostatic fields can be imparted to the mold. Preferably, the mold also includes louvered portions corresponding to the areas of the garment requiring finishing. A plurality of layers of charged fibers are then deposited electrostatically on the mold. By varying the electrostatic field, at least some of the fibers comprising preselected layers thereof can be oriented in accordance with the elasticity requirements of particular areas of the garment. The garment is then at least partially precured prior to coloring. By varying the electrostatic field again, one or more colored dyes can be electrostatically applied sequentially thereto in predetermined patterns to produce a garment of the desired style. The garment is then cured to set the color pattern and fibers, after which the garment is removed from the mold for finishing.

DESCRIPTION OF THE DRAWINGS

A more complete understanding of the invention may be had by reference to the following Detailed Description when taken in conjunction with the accompanying Drawings, wherein.

DETAILED DESCRIPTION

Figure 1:
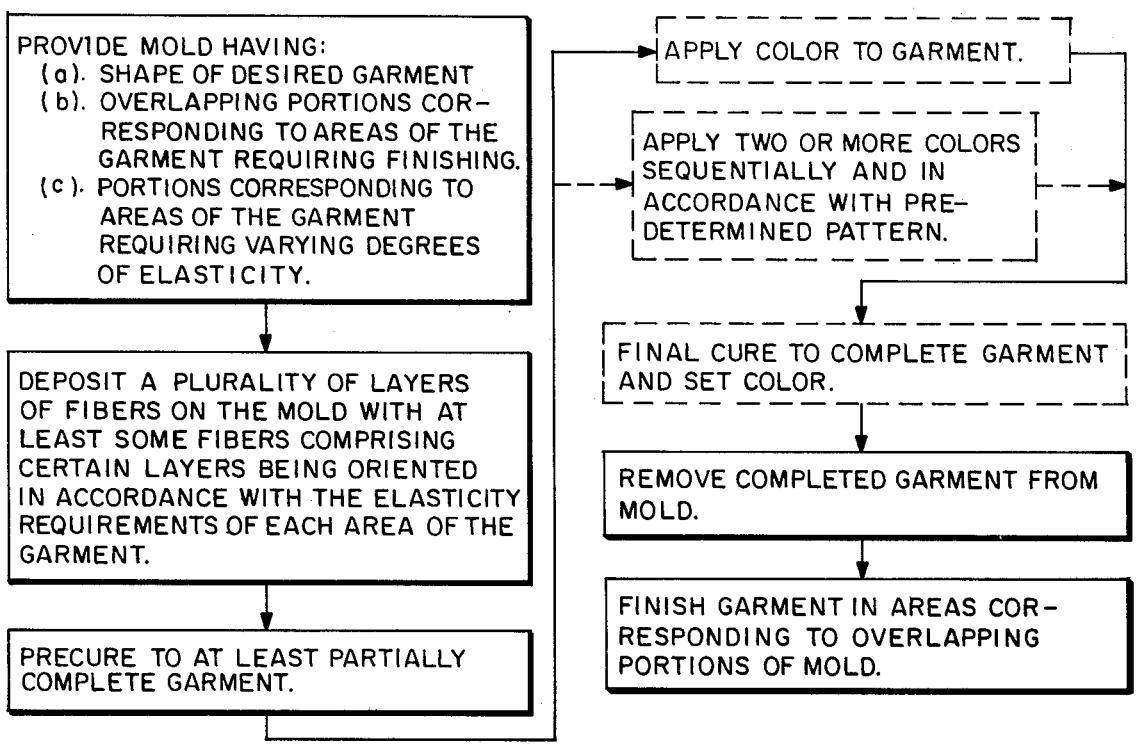
FIG. 1 is a block diagram illustrating a method of manufacturing garments incorporating the invention.

Referring now to the Drawings, and particularly to FIG. 1 thereof, there is illustrated a block diagram of a method of manufacturing garments incorporating the invention. By means of the invention, the material, colors and patterns of a garment are formed directly on a mold having the size and shape of the desired garment. A controllable electrostatic field is created about the mold, by which a plurality of fiber layers are then deposited to form a garment. Electrostatic deposition is also employed to effect application of one or more dyes sequentially to the mold in preselected patterns to effect the desired coloration. Use of the method of the invention results in material savings, reduced labor costs as well as minimum inventory over that heretofore associated with garment manufacturing.

Figure 2:
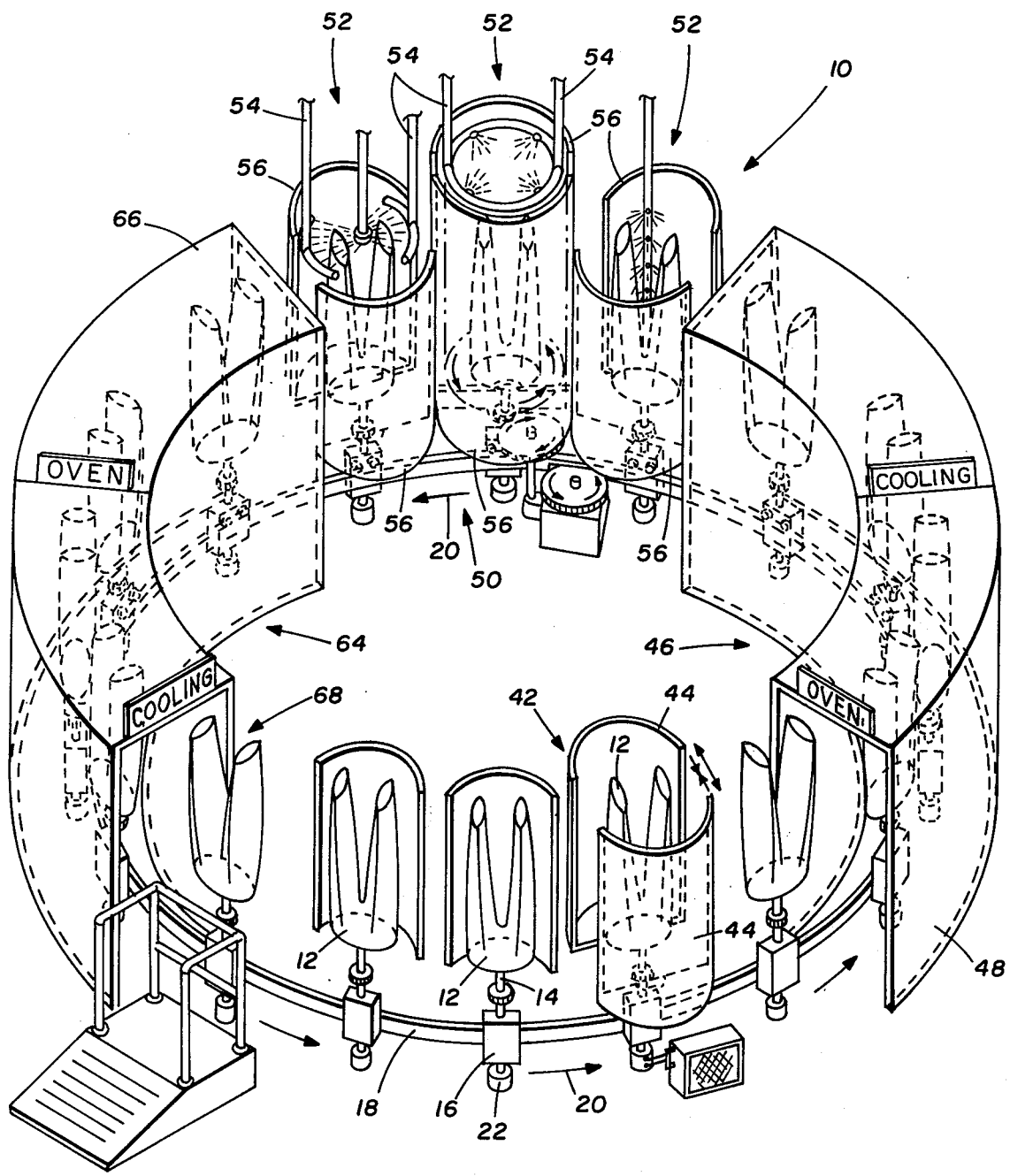
FIG. 2 is an illustration of an apparatus for manufacturing garments by means of the invention.

In reference to FIG. 2, there is shown an apparatus for making garments 10 by the method of the invention. Apparatus 10 includes a series of garment molds 12, each mounted on a post 14 secured to a trolley 16. Each mold 12 is transported by its respective trolley 16 around a course defined by track 18 in the direction of arrows 20. Preferably, all trolleys 16 are transported simultaneously so that molds 12 are indexed continuously through the various steps comprising the invention. The means for conveying trolleys 16 can comprise any suitable structure, such as for example, chain drive means. In addition, each trolley 16 includes a data transfer device 22 whereby appropriate sensors are actuated as each successive mold 12 is indexed through the steps comprising the method of the invention. Data transfer devices 22 can comprise, for example, conventional optical or magnetic devices.

Figure 3:
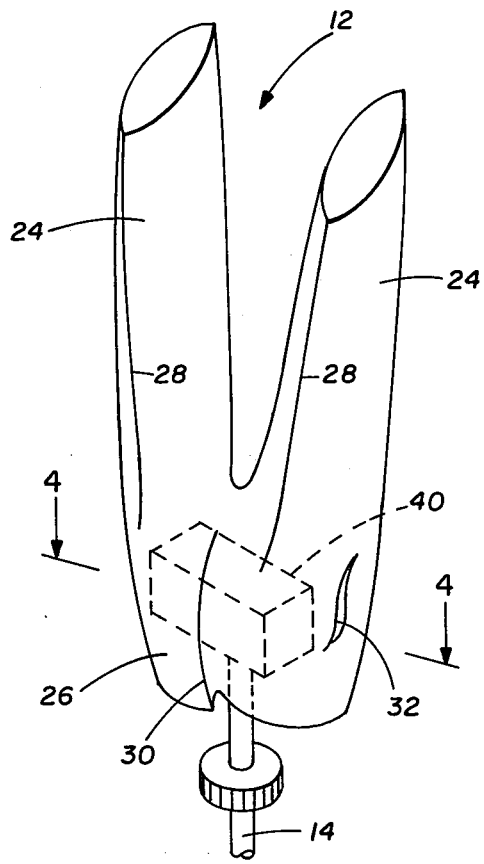
FIG. 3 is an illustration of a mold which can be utilized in the practice of the invention.
Figure 4:
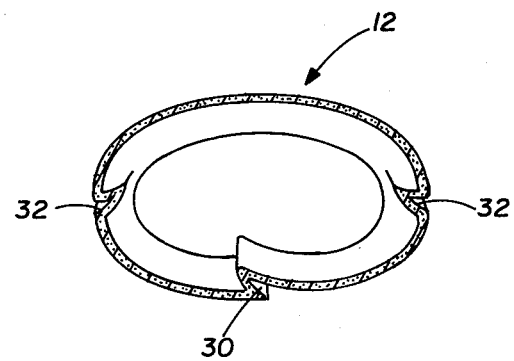
FIG. 4 is a sectional view taken generally along lines 4—4 in FIG. 3.

Referring to FIG. 3, there is shown a garment mold 12 utilized in the practice of the invention. Mold 12 comprises a male mold having the shape and size of the desired garment. For purposes of illustration, mold 12 is depicted as a trousers mold, however it will be understood that the method of the present invention is not limited to the fabrication of trousers only. The method of the present invention can be utilized in the manufacture of any garment which was heretofore constructed by sewing sections of precut fabric together. As shown, mold 12 includes generally elliptical leg portions 24 and an oval top portion 26. Slight ridges 28 are provided in mold 12 corresponding to the location of creases in the garment to be formed. Preferably, overlapped portions or louvers are provided in mold 12 corresponding to areas of the garment requiring finishing, such as at the fly 30 and pocket 32 locations as is best shown in FIG. 4.

Mold 12 is preferably constructed of a pliable elastomeric material; such as neoprene, plastic or silicone rubber. In accordance with the preferred embodiment of the invention, each mold 12 is precisely formed to produce a garment of a desired size. This approach requires at least one mold 12 of a given size for each size garment to be manufactured. However, if desired, mold 12 can be adapted for adjustable sizing so that garments of more than one size could be fabricated by adjustment of a single mold. This would be accomplished by constructing mold 12 with at least one inflatable chamber therein, whereby the size of the mold 12 would be controlled by changing pressure.

Figure 5:
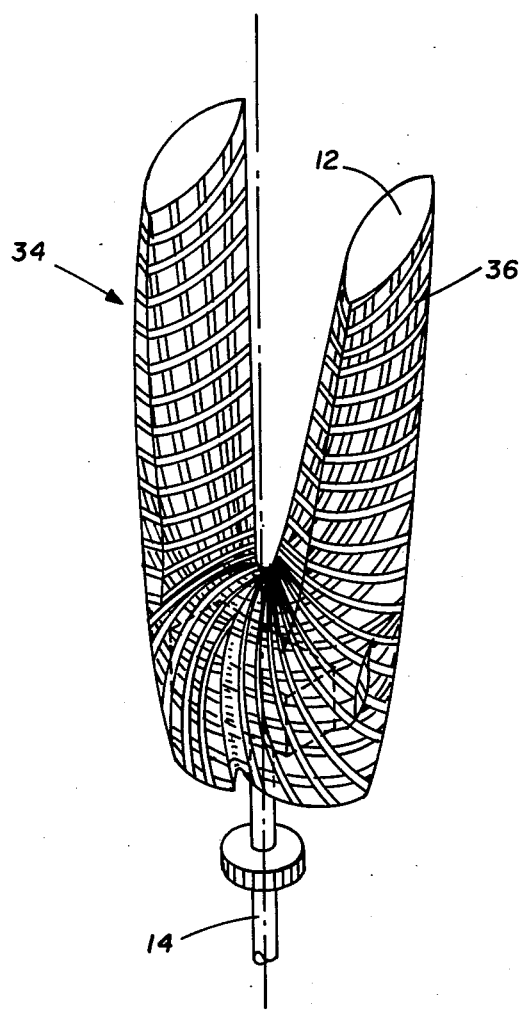
FIGS. 5 and 6 are illustrations of molds similar to that shown in FIG. 3 in which certain parts have been broken away to illustrate more clearly alternative matrices utilized to effect a predetermined electrostatic field around the mold.
Figure 6:
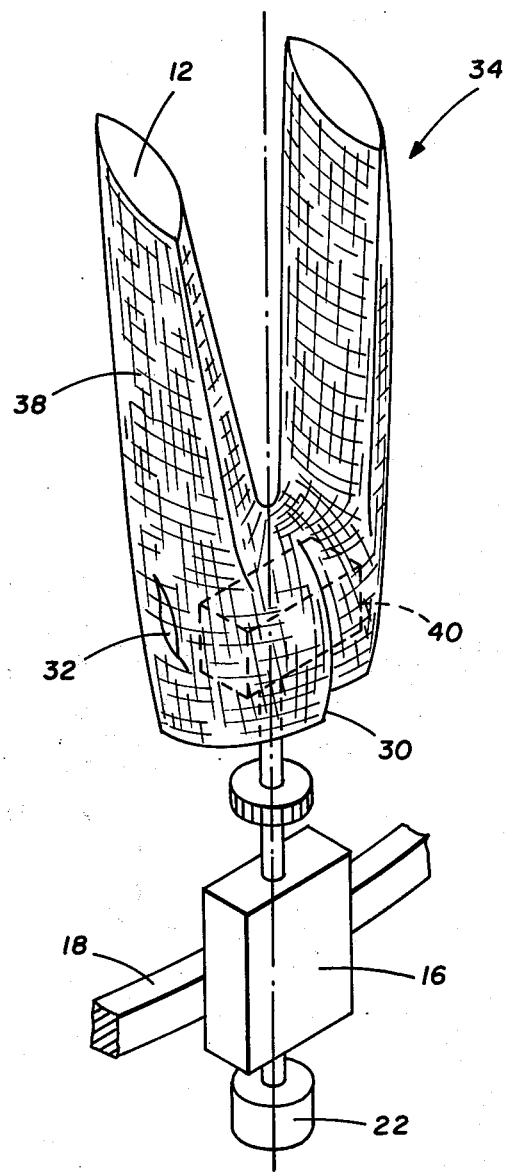

Turning to FIGS. 5 and 6, mold 12 further includes a matrix of electrical conductors 34 for establishing an electrostatic field over the surface thereof. Conductors 34 define the area of mold 12 on which the garment is to be formed. In particular, conductors 34 are arranged near the surface of mold 12 according to the desired electrostatic deposition to be effected. The matrix of conductors 34 is preferably comprised of a plurality of crisscrossing metal strips 36 as shown in FIG. 5, or of a plurality of fine wires 38 as is illustrated in FIG. 6. If desired, the matrix of conductors 34 could also comprise a network of point conductors mapping the surface of mold 12. Conductors 34 are connected to a suitable source of power (not shown) through a controller 40, which is best shown in FIG. 3. Controller 40 contains appropriate circuitry by which areas of the matrix of conductors 34 are energized to effect preselected electrostatic field characteristics. It will thus be apparent that the precise deposition of charged materials on mold 12 can be effected by means of the addressable matrix of conductors 34.

Referring again to FIG. 2 in conjunction with the flow chart in FIG. 1, a clean mold 12 is first advanced to station 42 for fiber deposition. In accordance with the preferred embodiment, opposing covers 44 close in surrounding relationship with mold 12. The matrix of conductors 34 is energized to effect the desired electrostatic field about mold 12. A plurality of layers of charged fibers are then deposited electrostatically onto the mold 12. The fibers are formed of polyesters, polyamides or other synthetic materials. Either undyed or predyed fibers can be utilized.

In accordance with the preferred embodiment of the invention, the electrostatic field surrounding mold 12 is changed between deposition of fiber layers so that at least some of the fibers comprising preselected layers are deposited on the mold 12 in an orientation corresponding to the elasticity requirements of particular areas in the garment. For example, it would be highly desirable to arrange the fibers of successive layers to provide enhanced elasticity in such areas as the crotch, knees and waist. On the other hand, it would be preferable to orient the fibers of successive layers in such areas as the creases to provide for inelasticity. Thus, a plurality of successive layers of fibers can be electrostatically deposited on mold 12 to form a garment with particular areas of preselected elasticity. It will be understood that the capability of electrostatically preforming a garment with areas of different elasticities comprises a significant feature of the invention.

Following the application of a plurality of fiber layers, covers 44 retract and the garment on mold 12 is precured at station 46. Station 46 includes oven section 48 for partially setting the fibers comprising the garment formed on mold 12. Oven section 48 includes means for partially curing the deposited layers on mold 12. If desired, radiation means could be used in addition to or as a substitute for heating elements within oven section 48. Following the partial precuring of the garment, it is preferably allowed to cool down prior to entering station 50.

At station 50, additional colorants can be applied as desired to the garment. In particular, station 50 can include more than one coloring step. As shown in FIG. 2, station 50 comprises three substations 52. Each substation 52 includes a nozzle assembly 54 leading to a suitable source of dye of the desired color. Each of the coloring substations 52 includes an opposed pair of covers 56 which close in surrounding relationship with mold 12. In the three coloring substation arrangement depicted in FIG. 2, mold 12 is advanced into the first substation 52 and enclosed by covers 56. The desired electrostatic field is established with controller 40 and matrix of conductors 34, after which the desired first color is applied to the garment from first nozzle assembly 54. First covers 56 are then reopened to allow advancement of mold 12 into subsequent substations 52 for application of additional colorants to the garment. Thus, by varying the definition of the electrostatic field over mold 12, discrete colorants can be deposited in successive fashion on the garment to generate desired patterns. Garments with plaids, stripes, checks and other popular patterns can be produced in this manner. It will be understood that the capability of electrostatically effecting colors and patterns in a garment comprises another significant feature of the invention.

After receiving the desired application of colorant at station 50, the garment on mold 12 is advanced to station 64 for final curing. Station 64 includes an oven section 66 through which mold 12 passes first. Oven section 66 includes means for curing the garment to permanently set the fibers and colors therein. If desired, the heating means in oven section 66 can comprise a radiation source in conjunction with or as a substitute for heating elements. After the garment is fully cured in the oven section 66, the garment is preferably allowed to cool down before leaving station 64.

At station 68 the preformed garment is removed from mold 12 for final finishing. Removal is accomplished by releasing the garment from mold 12. After removal from mold 12, the preformed garment is finished by the addition of pockets, zipper, waistband, belt loops, buttons, cuffs and so forth. Before reentering station 42 for another application of fibers, mold 12 is preferably inspected and cleaned if necessary.

From the foregoing, it will be understood that the present invention comprises a method of fabricating garments which incorporates numerous advantages over the prior art. One important advantage deriving from the method of the invention involves the fact that numerous manual and semi-automatic operations which were heretofore required in the fabrication of garments have been eliminated. Other important benefits derive from the capability of electrostatically depositing fibers in predetermind orientations and locations in the garment to provide the desired elasticity. A further advantage afforded by the use of electrostatic deposition is that a plurality of colored dyes can be applied in succession to the preformed garment to generate numerous color and pattern combinations. Other advantages deriving from the use of the invention will readily suggest themselves to those skilled in the art.

Although particular embodiments of the invention have been illustrated in the accompanying Drawings and described in the foregoing Detailed Description, it will be understood that the application is not limited to the embodiments disclosed, but is intended to embrace any alternatives, modifications, rearrangements and substitutions of parts or elements as fall within the spirit and scope of the invention.

What is claimed is:

1. A method of fabricating a nonwoven garment, comprising:
   a. providing a mold member in the shape of the desired garment and including means for selectively establishing at least one electrostatic field over said mold member;
   b. establishing a predetermined electrostatic field about said mold member;
   c. dispensing into said electrostatic field activatible fibers which are electrostatically deposited in a successive plurality of fiber layers over the mold member in a nonwoven mass;
   d. electrostatically orienting during step (c) over predetermind portions of the mold member at least some of the fibers comprising at least one of the fiber layers in accordance with the elasticity requirements of corresponding portions of the desired garment;
   e. terminating dispensation of the fibers into the electrostatic field and onto the mold member;
   f. activating the fibers deposited on the mold member to set and bond the fiber layers into a flexible structure defining the garment; and
   g. removing the garment from said mold member.

2. The method of claim 1 wherein the mold member includes louvers at locations corresponding to at least some of the areas of the garment requiring further finishing.

3. The method of claim 1 wherein the means within the mold member for establishing an electrostatic field over said mold member comprises a network of addressable conductors.

4. The method of claim 1 wherein the mold member is constructed of pliable elastomeric materials.

5. The method of claim 1 wherein the fibers are formed of materials selected from a group consisting of polyester and polyamide materials.

6. The method of claim 1 further including between steps (f) and (g) the step of applying colorants to at least portions of the flexible structure defining the garment.

7. A method of constructing a nonwoven garment, comprising:
   a. providing a mold member in the shape of the desired garment and having a matrix of addresable conductors within said mold member for selectively establishing a plurality of electrostatic fields of predetermined definitions over said mold member;
   b. establishing an electrostatic field about said mold member;
   c. dispensing into said electrostatic field activatible fibers to deposit said fibers over said mold member in a successive plurality of fiber layers forming a nonwoven mass;
   d. electrostatically orienting during step (c) over predetermined portions of the mold member at least some of the fibers comprising at least one of the fiber layers in accordance with the elasticity requirements of corresponding portions of the desired garment;
   e. terminating dispensation of the fibers into the electrostatic field and thus terminating deposition of said fibers over the mold member;
   f. dispensing into said electrostatic field particles of colorants which are deposited onto at least portions of the nonwoven mass;
   g. terminating dispensation of the particles of colorants into the electrostatic field and thus terminating deposition of said colorants onto the nonwoven mass;
   h. activating the nonwoven mass deposited on the mold member to set and bond the fiber layers and colorants into a flexible structure defining the garment; and
   i. removing the garment from the mold member.

8. The method of claim 7 wherein step (f) comprises the successive dispensation and electrostatic deposition of a plurality of charged dye particles of predetermined colors.

9. The method of claim 7 further including between the steps (e) and (f) the step of partially activating the fibers deposited over the mold member to partially set and bond the fiber layers preparatory to deposition of the particles of colorants.

10. The method of claim 7 wherein step (d) is carried out by selectively varying the definition of the electrostatic field surrounding the mold member between successive dispensations of fibers into said electrostatic field so that at least some of the fibers comprising certain of the fiber layers are electrostatically deposited onto the mold member in predetermined orientations.

11. The method of claim 7 wherein step (h) is carried out by successively varying the definition of the electrostatic field surrounding the mold member between successive dispensations of colorants into said electrostatic field so that the colorants are electrostatically deposited in predetermined orientations onto the nonwoven mass.

12. A method of manufacturing a nonwoven garment comprising:
   a. providing a pliable male mold member in the shape of the desired garment and including a matrix of addressable conductors within said mold member for selectively establishing about said mold member a plurality of electrostatic fields of predetermined definitions;
   b. establishing by means of said matrix of addressable conductors a predetermined electrostatic field about said mold member;
   c. dispensing into said electrostatic field thermosetting fibers to electrostatically deposit a plurality of successive fiber layers over said mold member;
   d. selectively varying the definition of the electrostatic field over at least one predetermined portion of the mold member between successive dispensations of the fibers into the field to orient at least some of the fibers comprising certain fiber layers in accordance with the elasticity requirements of corresponding portions of the desired garment;
   e. terminating dispensation of fibers into the electrostatic field and thus terminating deposition of fibers over the mold member;

f. partially heating the fiber layers deposited onto the mold member to partially cure and bond the fibers together to form a flexible, nonwoven structure defining the garment;

g. successively dispensing into said electrostatic field a plurality of colored dye particles to electrostatically deposit said dye particles onto the partially cured garment;

h. selectively varying the definition of the electrostatic field over predetermined portions of the mold member during step (g) between successive dispensations of colored dye particles to effect deposition of said particles in predetermined patterns on the desired garment;

i. finally heating the flexible nonwoven structure to completely cure and bond the fibers and color patterns therein and form the garment; and j. removing the garment from the mold member.

UNITED STATES PATENT AND TRADEMARK OFFICE
CERTIFICATE OF CORRECTION

PATENT NO. : 4,145,388
DATED : March 20, 1979
INVENTOR(S) : Joseph W. A. Off and Judson H. Early It is certified that error appears in the above–identified patent and that said Letters Patent are hereby corrected as shown below:

Column 6, line 40 change "successively" to --selectively--.

Signed and Sealed this

Thirty-first Day of July 1979

[SEAL]

Attest:

LUTRELLE F. PARKER
Attesting Officer    Acting Commissioner of Patents and Trademarks